United States Patent Office 2,829,220
Patented Apr. 1, 1958

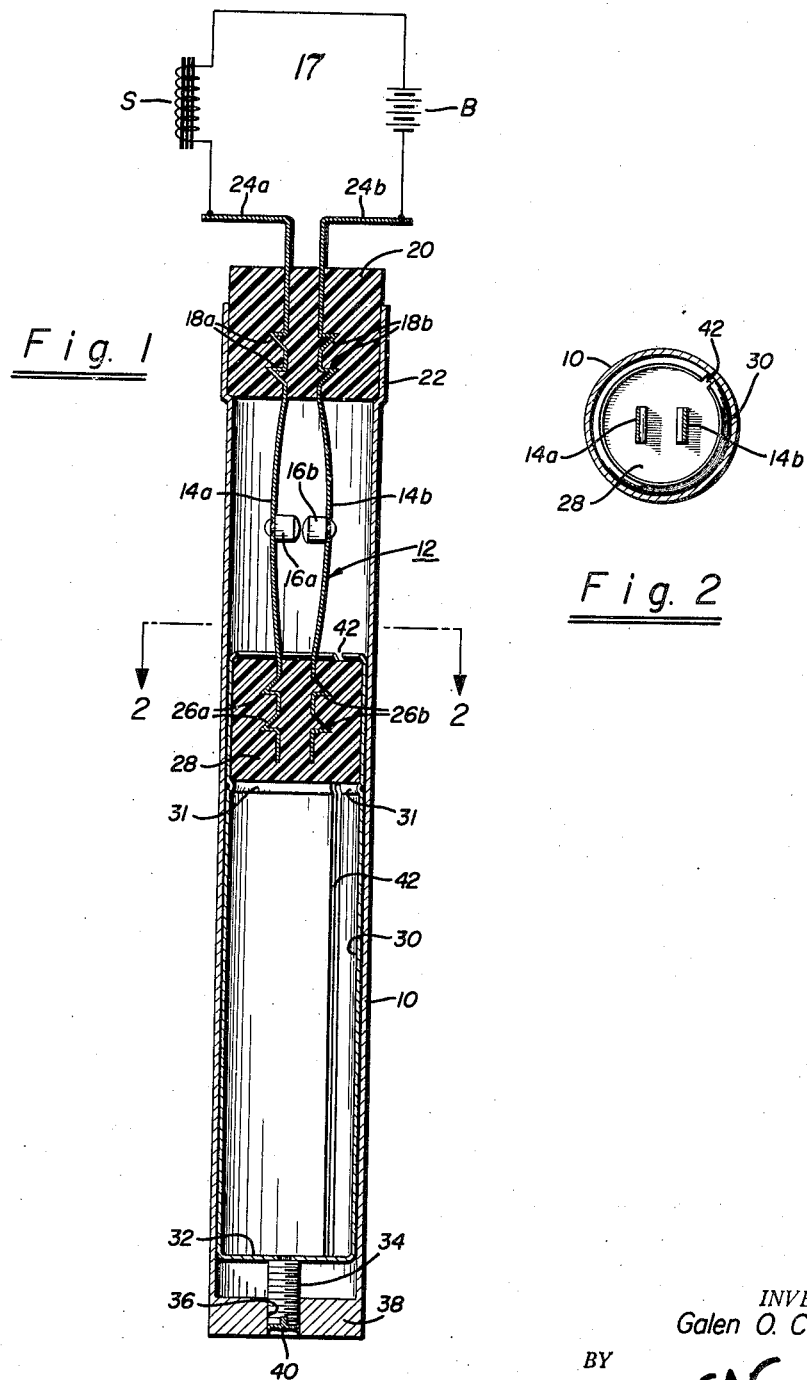

2,829,220

TEMPERATURE RESPONSIVE SWITCH UNIT

Galen O. Chapman, Centerville, Calif., assignor of one-half to Theodore H. Liebenberg, Boulder Creek, Calif.

Application July 23, 1956, Serial No. 599,537

12 Claims. (Cl. 200—137)

The present invention relates to temperature-responsive switches of the type known as thermostatic switches, such as are employed to close or open electric control circuits in accordance with predetermined temperature changes. More particularly, the present invention relates to temperature-responsive switches of the type employed to control fire detection circuits.

It is an object of the present invention to provide a temperature-responsive switch unit that may readily be set to respond at a predetermined temperature level.

Another object of the invention is to provide a temperature-responsive switch unit, for fire detection circuits, which is capable of discriminating in its response between an actual fire emergency and normal temperature increases.

In this connection, it is an object of the invention to provide a temperature-responsive switch unit, that responds practically instantaneously to a rapid temperature rise, but exhibits a delayed response to gradual temperature increases.

It is a specific object of the invention to provide a thermostatic switch, of the type referred to, that responds to a rapid temperature rise at a substantially lower temperature level than to a gradual temperature increase.

Furthermore, it is an object of my invention to provide a thermostatic switch, of the type referred to, that responds practically instantaneously to a rapid rise in temperature to close a fire detection circuit and which, when actuated in this manner, maintains the circuit closed until the emergency has passed.

Yet another object of the invention is to construct a thermostatic switch, of the type referred to, in such manner that its component parts will automatically be centered relative to each other.

An additional object of the invention is to supply a thermostatic switch of a construction that may readily be duplicated to provide identical performance.

These and other objects of the present invention will be apparent from the following description of the accompanying drawing which illustrates a preferred embodiment thereof and wherein:

Figure 1 is a longitudinal central section through a thermostatic switch unit constructed in accordance with my invention, and Figure 2 is a cross section through the switch unit shown in Figure 1 taken along line 2—2 thereof, and viewed in the direction of the arrows associated with said line.

The thermostatic switch assembly of the invention comprises an outer housing 10 in the form of a thin-walled cylindrical shell of a metal or metal alloy of high thermal conductivity and a high thermal expansion coefficient, such as brass or stainless steel. Within the housing 10 is received the actual contact-establishing mechanism 12 of the switch, which is formed by two oppositely arched, juxtaposed spring struts 14a and 14b that face each other with their concave surfaces and which carry at the midpoints of said concave surfaces opposed contact beads 16a and 16b, respectively, that are preferably made of silver. The struts 16a and 16b form part of an electric circuit 17, diagrammatically represented by a battery B and a solenoid S in Figure 1. During normal temperature conditions the circuit 17 is interrupted by subjecting the struts to sufficient pressure to flex them outwardly away from each other and thus keep the contact beads 16a and 16b apart. For this purpose the upper end portions of the struts form barbs 18a and 18b, respectively, and are embedded in spaced relation in a cylindrical plug 20 of a suitable dielectric plastic, which is fitted into and firmly held within the radially expanded upper portion 22 of housing 10. To form connector lugs the upper projecting ends of the struts may be turned radially away from each other, as shown at 24a and 24b. The lower end portions of the struts are likewise formed into retaining barbs 26a and 26b, respectively, and are embedded in spaced relation in another cylindrical plug 28 of a dielectric plastic which is slidably received within the cylindrical housing 10. To hold the struts under sufficient pressure to keep the contact beads 16a and 16b apart under normal temperature conditions, the slidable plug 28 is firmly held within the upper end of a cylindrical metal sleeve 30 and bears with its bottom face against a circular shoulder 31 formed in said sleeve; and the sleeve in turn is snugly yet slidably received within the lower part of housing 10 and bears with its closed lower end 32 against the flat top surface of a set screw 34 of relatively large diameter. The screw 34 is threadably received in a threaded bore 36 provided in the closed bottom end 38, of housing 10, which end is of substantial thickness as shown in Figure 1. By turning the set screw 36 in such a manner that it moves deeper into the housing, the sleeve 30 is forced upwardly and applies increased pressure to the slidable plug 28; and since the upper plug 20 within which the upper ends of struts 14a and 14b are embedded, is immovable relative to the housing 10, the struts are bent outwardly away from each other so that the contact beads 16a and 16b are separated. Thus, by appropriate manipulation of set screw 36, the described switch unit may be adjusted at any selected temperature level to interrupt or close the electric circuit 17.

For instance, assuming it to be desirable that the described switch close an electric fire detection circuit when the ambient temperature rises above a level of, say, 145° F., the unit is immersed in a bath of water held at 145° F. until the whole assembly has heated up to, and is saturated with, a temperature of 145° F. Then the screw 36 is turned until the pressure it exerts upon the bottom of sleeve 30 and hence through plug 28 upon the spring struts 14a and 14b is such that the contact beads 16a and 16b are barely separated from each other and just about to close. Upon any further increase in the ambient temperature above 145° F., the resultant longitudinal expansion of the housing 10 relaxes the pre-set pressure upon sleeve 30 and struts 14a and 14b. This permits the struts to straighten out and as a result thereof the beads 16a and 16b make contact with each other and close the fire detection circuit 17. On the other hand, when the temperature drops below 145° F., the housing 10 contracts which causes the screw 36 to exert pressure upon the sleeve 30. This tends to raise the slidable plug 28 and exerts presure upon the struts causing them to bend outwardly away from each other and separate the contact beads 16a and 16b, so that the fire detection circuit is interrupted; and as the temperature continues to drop and reaches a normal level of, say, 85° F. or 75° F., the pressure upon the struts is correspondingly increased. As a result thereof, the contact beads 16a and 16b may, at the normal temperature level of, say 85° F. or 75° F., move further apart from each other than necessary to interrupt the fire detection circuit. Excessive spacing of the contact beads at normal temperature levels has the serious disadvantage that in case of a real fire emergency, when the ambient temperature rises at a rate of, say 50° F. or 60° F. per minute, it may take too long for the beads to make contact with each other and set off whatever alarm signals or automatic fire fighting equipment the fire detection circuit 17 may control. For a fire detection switch to operate satisfactorily at such rapid rates of temperature increase, the switch should close at a temperature level much below the above mentioned danger level of 145° F., at which it was initially set to close under any circumstances no matter what the cause for the temperature increase might be. It is not possible to secure such performance of the switch by resetting the calibrating screw 36 at a normal temperature level to ease the pressure upon the struts 14a and 14b sufficiently and thus to permit the contact beads 16a and 16b to move closer together, because if this were done, a gradual temperature increase, such as might occur due to normal circumstances, would effect closure of the fire alarm circuit at a much lower temperature than the pre-set danger level and would cause fire bells to ring and automatic fire fighting equipment to enter into operation without a real emergency.

It is a particular object of the present invention to provide a thermostatic fire detection switch, of the type referred to, wherein the contact beads may be situated very close to each other at a normal temperature level, so that they may quickly make contact in case of a real emergency indicated by a rapid rise in the ambient temperature, yet will not come into contact with each other upon a gradual rise in the ambient temperature until the temperature rises to a level substantially above the temperature level at which a rapid rise in the ambient temperature effects closure of the contact beads.

To achieve this object, I introduce into the space between the slidable plug 28 of the contact establishing switch mechanism 12 represented by the spring struts 14a and 14b, and the set screw 36 in the bottom of housing 10 the hereinbefore described sleeve 30, and I construct said sleeve of a material of a high thermal coefficient of expansion, such as aluminum, which is higher in fact than that of the brass or steel from which the outer housing is made. On the other hand I construct the spring struts 14a and 14b of a material of the lowest possible thermal expansion coefficient, such as the alloy known under the name of Invar whose thermal coefficient of expansion is negligible, and I proportion the length of sleeve 30 relative to the length of housing 10 in such a manner that the actual increase in the length of sleeve 30 in the temperature range here under consideration, i. e. between 75° F. to about 150° F. is slightly less than the actual increase in the length of the housing 10 through said temperature range, in spite of the higher thermal expansion coefficient of the material from which the sleeve 30 is made. In the particular embodiment of the invention illustrated in the accompanying drawing, wherein the outer housing is made of brass, the struts 14a and 14b are made of Invar and the sleeve 30 is made of aluminum, the length of the sleeve should not exceed two thirds of the length of the housing 10 to establish the slight difference between the actual elongation of the outer housing 10 and the actual elongation of the inner switch elements 14a, 14b and 30 that is necessary to actuate the contact establishing mechanism of the switch.

A thermostatic switch constructed in the described manner may be adjusted to effect contact of its contacts beads 16a and 16b at a selected danger level of, say, 145° F. in the manner previously described, by immersing it in a bath of water held at the selected temperature level until every part of its assembly has heated up to and is thoroughly saturated with this temperature, whereupon the calibrating screw 34 is manipulated until the beads 16a and 16b are about to make contact. The proper position of the calibrating screw may then be rendered permanent by dropping solder onto the outer end of the screw within the bore 36, as shown at 40 in Figure 1.

When the adjusted switch unit is removed from the test bath and is exposed to a normal room temperature of, say 85° F., the outer housing will commence to contract, but so will the sleeve 30 which, as pointed out hereinbefore, is made of a material having coefficient of thermal expansion that is preferably higher than the coefficient of expansion of the material from which the housing 10 is made. Thus, while the contact beads 16a and 16b will separate, as the temperature of the switch assembly drops below 145° F. because the outer housing is exposed directly to the cooler outside temperature and will therefore cool more quickly than the sleeve 30, the beads 16a and 16b will not move too far apart, because the inner sleeve will also cool, though more gradually, and will eventually contract by very nearly the same distance as the outer housing. As a result thereof, the pressure exerted upon the spring struts 14a and 14b will scarcely increase, once the beads have separated, and thus the beads will remain in close proximity even after the total switch assembly has cooled down to a normal temperature level.

With the beads separated from each other by only a very small gap, a sudden rise in the ambient temperature of, say 50° F. or 60° F. per minute will cause the beads to make contact with each other in a matter of seconds and will thus set fire alarm devices and/or fire fighting equipment into operation before a fire has time to spread, because a rapid increase in the ambient temperature causes the outer housing to expand before the heat has time to reach and expand the inner sleeve 30, and because a very small elongation of the outer housing will be effective to relax the pressure upon the spring struts 16a and 16b sufficiently to cause the beads to negotiate the very small gap by which they are separated; and once the beads have made contact, they will remain in contact with each other as the ambient temperature increases further, though the heat will soon reach the inner sleeve and cause it to expand, because as previously pointed out, the length of sleeve 30 is so proportioned relative to the length of housing 10, taking into consideration the thermal expansion coefficients of the different materials from which the sleeve and the housing are made, that the actual increase in the length of the latter is somewhat greater than the actual increase in the length of the former through the critical temperature range from 85° F. to 145° F., and at said latter temperature the switch was pre-set to effect closure of its contact beads under any and all circumstances, as previously explained.

Reverting again to the condition of the switch at a normal temperature, let it now be assumed that the ambient temperature rises gradually, say, at a rate of from 5° F. to 15° F. per minute, such as occurs under ordinary circumstances. In such an event the housing 10 expands gradually, and due to the thinness of its wall and the close proximity of sleeve 30 to the wall of the housing, the increase in ambient temperature will be transmitted to the sleeve before the housing has expanded to any appreciable extent and will cause an elongation of the sleeve that is initially only negligibly less than the elongation of the outer housing. As a result thereof the increase in the length of the outer housing as effected by a gradual increase in the ambient temperature remains incapable of actuating the switch until the ambient temperature reaches the danger level at which the switch unit was initially adjusted by manipulation of calibrating screw 34 to permit closure of the contact beads 16a and 16b. To enable the performance-controlling sleeve 30 to react quickly to any heat transmitted to it through the wall of housing 10, its wall thickness should be very thin, and should preferably be only one half of the wall thickness of the outer housing. On the other hand, to avoid binding of the inner sleeve 30 against the housing 10, in the event that its diameter should expand more quickly than the inner diameter of the housing, the sleeve should be slit lengthwise so that is has actually a longitudinal slot 42 (Figure 1) that extends from end to end.

The switch unit of the present invention as illustrated in the accompanying drawing and as described hereinbefore is of a simple and compact construction. Owing to the presence of the control sleeve 30 it can readily be made to perform in a manner that is ideal for fire detection switches, i. e., it will effect almost instantaneous closure of the contacts upon a rapid increase in the ambient temperature, and yet will delay closure of the contacts when the temperature rises gradually until a pre-set danger level has been reached. Once closed, the contacts will remain closed as long as the emergency exists.

The performance controlling sleeve 30 has the added advantage that it properly centers the contact establishing mechanism 28, 14a, 14b, and 20 of the switch within the housing 10, due to its substantial length in a direction axially of the housing and due to the manner in which it fits into said housing. Also, since the performance of the switch is controlled by the differential reactions of the outer housing 10 and the sleeve 30 to temperature changes, and is not significantly affected by the reaction of the spring struts 14a and 14b to temperature changes, which struts are in fact preferably made of a material that has a thermal expansion coefficient approaching zero, the struts may be made relatively short which makes it easy to produce them of accurately the same size and with identical mechanical characteristics, and thus renders switches constructed in accordance with my invention more dependable in their performance when produced by mass production methods.

While I have explained my invention with the aid of a particular embodiment thereof, it will be understood that the invention is not limited to the specific constructional details shown and described which may be departed from without departing from the scope and spirit of the invention.

I claim:

1. A thermostatic switch unit comprising a metal housing, and disposed within said housing an arched spring strut having a low coefficient of thermal expansion and materially shorter than the housing carrying a switch contact and having one of its ends held stationary with regard to the adjacent end of said housing, and an elongated compensating thrust member having a high thermal expansion coefficient mounted within the housing and interposed between the opposite end of said spring strut and the opposite end of said housing and in thrust relation with both.

2. A thermostatic switch unit comprising an outer metal housing; disposed within said housing in tandem relation an arched spring strut carrying a switch contact and having its outer end held stationary with regard to the adjacent end of said housing, and an elongated member of a metal of a higher thermal expansion coefficient than said housing interposed between the opposite end of said spring strut and the opposite end of said housing; and means at the last mentioned end of said housing operable to force said member against said spring strut.

3. A thermostatic switch unit comprising a thin-walled cylindrical housing; disposed within said housing in tandem relation a spring strut carrying a switch contact and having its outer end held stationary with regard to the adjacent end of said housing, and a thin-walled cylindrical sleeve of a metal of a high thermal expansion coefficient interposed between the opposite end of said spring strut and the opposite end of said housing in close proximity to the inner face thereof; and means at the last mentioned end of said housing operable to force said sleeve against said spring strut.

4. A thermostatic switch unit comprising a thin-walled outer housing of a material of a high thermal coefficient of expansion; disposed within said housing in tandem relation an arched spring strut of a material of a low thermal coefficient of expansion having its outer end held stationary with regard to the adjacent end of said housing, and a member of a material of a higher thermal expansion coefficient than said housing interposed between the opposite end of said spring strut and the opposite end of said housing, and means at the last mentioned end of said housing operable to force said member against said spring strut.

5. A thermostatic switch unit comprising a thin-walled outer housing of a metal of a high thermal expansion coefficient and closed at both ends, disposed within said housing a spring strut having a low coefficient of thermal expansion and substantially shorter than the interior length of the housing, and carrying a switch contact, said strut having one of its ends held stationary with regard to the adjacent end of said housing, a thin-walled thrust sleeve of a metal of a high thermal expansion coefficient interposed in thrust relation between the opposite end of said spring strut and the opposite end of said housing, said sleeve being of such size that its outer surface lies closely adjacent the inner surface of said housing, and adjusting means at the last mentioned end of said housing operable to force said sleeve toward said spring strut.

6. A switch unit according to claim 5 wherein the opposite end of said spring strut is held in a cylindrical plug of a dielectric material and said plug in turn is held in the adjacent end of said sleeve.

7. A switch unit according to claim 5 wherein the wall of said sleeve is thinner than the wall of said housing.

8. A thermostatic switch unit comprising a thin-walled outer housing of a metal of a high thermal expansion coefficient, disposed within said housing a spring strut carrying a switch contact, said strut having one of its ends held rigid with regard to the adjacent end of said housing, a thin-walled sleeve of a metal of a high thermal expansion coefficient interposed between the opposite end of said spring strut and the opposite end of said housing, said sleeve being of such size that its outer surface lies closely adjacent the inner surface of said housing and being provided with a longitudinal slot that extends from end to end, and means at the last mentioned end of said housing operable to force said sleeve toward said spring strut.

9. A thermostatic switch unit for fire detection circuits with differential response to rapid and gradual increases in the ambient temperature comprising a thin-walled housing of a material of high thermal conductivity and a high thermal expansion coefficient having an upper end and a lower end, a pair of oppositely arched juxtaposed spring struts of a material of a low thermal expansion coefficient carrying contact beads at the midpoints of their confronting surfaces received within said housing, a first plug of dielectric material encasing the upper ends of said struts and holding them stationary with regard to the upper end of said housing, a second plug of dielectric material encasing the lower ends of said spring struts slidably received within said housing, a thin-walled slit sleeve of a material of a high thermal conductivity and of a higher thermal expansion coefficient than the material from which said housing is made disposed within said housing in close contact therewith and arranged to support said second plug, and means at the lower end of said housing operable to vary the position of said sleeve axially of said housing.

10. A thermostatic switch unit for fire detection circuits with differential response to rapid and gradual increases in the ambient temperature, comprising a thin-walled cylindrical housing of a material of high thermal conductivity and a high thermal expansion coefficient having an open upper end and a closed lower end, a switch mechanism received in the upper portion of said housing, said switch mechanism being composed of a pair of oppositely arched juxtaposed spring struts of a material of an insignificant thermal expansion coefficient carrying contact beads at the midpoints of their confronting surfaces, a first plug of dielectric material encasing the upper ends of said struts and holding them in spaced relation to each other, said plug being arranged to close the upper end of said housing and to hold the upper ends of said spring struts stationary with regard to the upper end of said housing, a second plug of dielectric material encasing the lower ends of said spring struts and holding them in spaced relation to each other, said second plug being slidably received within said housing, a thin-walled slit sleeve of a material of a high thermal conductivity and of a higher thermal expansion coefficient than the material from which said housing is made disposed within said housing below said second plug and arranged to support said second plug, said sleeve being of substantial length as compared with the axial length of said housing, yet sufficiently short to maintain its elongation due to a predetermined temperature rise below the elongation of said housing resulting from the same temperature rise, and means at the closed end of said housing operable from without to vary the position of said sleeve axially of said housing.

11. An arrangement according to claim 1 wherein the co-efficient of thermal expansion of the thrust member is higher than that of the housing wall.

12. An arrangement according to claim 1 wherein the co-efficients of thermal expansion of the housing wall and of the thrust member are substantially proportional to their relative lengths, whereby, upon an equal heating of both the wall and the thrust member their actual linear expansion is substantially equal up to a predetermined maximum temperature.

References Cited in the file of this patent

UNITED STATES PATENTS

| | | |
|---|---|---|
| 2,384,153 | Bower | Sept. 4, 1945 |
| 2,393,841 | Titcomb | Jan. 29, 1946 |
| 2,691,710 | Collins et al. | Oct. 12, 1954 |
| 2,698,367 | Poitras | Dec. 28, 1954 |
| 2,755,359 | Rike | July 17, 1956 |